May 20, 1930.  G. H. BOWLUS  1,759,219
EXTENSOMETER
Filed Feb. 1, 1928
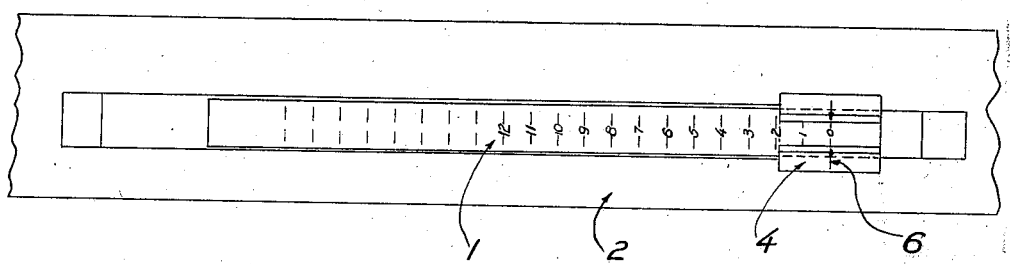
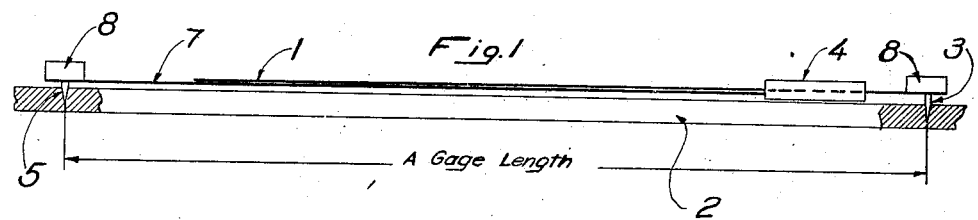
GLENN H. BOWLUS
INVENTOR
ATTORNEY Patented May 20, 1930

1,759,219

UNITED STATES PATENT OFFICE

GLENN H. BOWLUS, OF LOS ANGELES, CALIFORNIA

EXTENSOMETER

Application filed February 1, 1928. Serial No. 251,189.

My invention relates to the art of physical testing of materials with especial reference to tension tests of belt specimens.

The objects of my invention are: to provide a direct reading extensometer particularly adapted to belt testing; to provide an accurate extensometer at small cost, and to provide an extensometer with positive means for securing it to a belt.

I accomplish these objects by means of the instrument illustrated in the accompanying drawing in which:

Figure 1 is a side elevation of my extensometer showing it applied to a belt.

Figure 2 is a plan view of the same.

The function of an extensometer in a tension test is to measure the elongation of the test specimen as the load is varied. There are no instruments now available which satisfactorily obtain such measurements for a specimen of a belt. Heretofore in such testing a gauge length would be marked on the belt specimen with a pair of dividers, the usual gauge length being 8 inches. Then as the test proceeded the operator would readjust the dividers to the increased distance between the gauge marks and then read on a scale the distance between the divider points. Two errors enter each of these observations; first, in setting the dividers and second, in measuring the distance between their points. In my improved extensometer there is no transferring of dimensions by means of dividers with its attendant adjustments to be made after the test starts.

Referring to the drawing, a graduated steel tape 1 is adapted to be secured to the test specimen 2 by a tack-like point 3 secured in one end of the graduated tape. A slider 4 is secured to the belt by a tack point 5, the graduated steel tape 1 being adapted to pass through slider 4 with the graduated side out. A reference mark 6 is provided on slider 4.

The graduations on tape 1 are proportioned to directly read the percent elongation of the gauge length against the mark 6 on slider 4. When the zero of the graduated scale coincides with mark 6 the two tack points are separated by the correct gauge length. In applying my extensometer it is only necessary to push the tack points into the belt, keeping the zero of the graduated scale in coincidence with mark 6 on the slider.

For construction reasons I prefer to secure slider 6 to a steel tape 7 which has the tack point 5 secured in the end opposite the slider. Tape 7 lies under the graduated scale and parallel to it. By this construction a substantial head 8 can be provided for both tack points, materially adding to the ruggedness of the instrument.

By the use of my extensometer the difficulties of belt testing are materially reduced. With the sample in the testing machine all that is necessary to apply this extensometer is to push the tack points into the belt. The use of such points does no appreciable harm to the belt and they provide a very definite gauge length, the reduction in area of the belt during testing being unlikely to cause them to slip. As frequently as desired during the test the extensometer can be read, the reading being numerically the percent elongation of the specimen between the tack points. In belt testing there is no need of the fineness of measurement that is required in tension tests of metals so that the direct reading of the scale is quite accurate enough. An error of not more than one eighth inch in the gauge length can be easily obtained and such error will not vitiate the reliability of the readings.

It is obvious that the principles of my invention herein set forth can be applied with various modifications and I do not limit myself to the specific embodiment illustrated except as defined in the accompanying claims.

I claim as my invention:

1. An extensometer for measuring elongation in tension tests, comprising: a first tack point and a tape secured thereby to the material under test; a slider affixed to an end of said tape; a second tack point and a flexible graduated scale secured thereby to said material, said scale being adapted to longitudinally traverse said slider in such manner that the elongation of that portion of said material lying between said tack points reads on said scale against a mark on said slider.

2. An extensometer for measuring elongation in tension tests, comprising: a first tack point and a slider; means for positioning said slider in relation to the material under test by said tack point; a second tack point and a flexible graduated scale secured thereby to said material, said scale being adapted to longitudinally traverse said slider in such manner that the elongation of that portion of said material lying between said tack points reads on said scale against a mark on said slider, said tack points being separated by a predetermined distance when the zero point of said scale coincides with said mark on said slider.

3. An instrument as and for the purpose set forth in claim 2, in which said graduated scale is calibrated in such manner that the elongation of said predetermined length reads directly as the ratio of said elongation to said length.

In witness that I claim the foregoing I have hereunto subscribed my name this 27th day of January, 1928.

GLENN H. BOWLUS.